T. L. McCLELLAN.
TRUCK.
APPLICATION FILED APR. 12, 1909.
949,942. Patented Feb. 22, 1910.
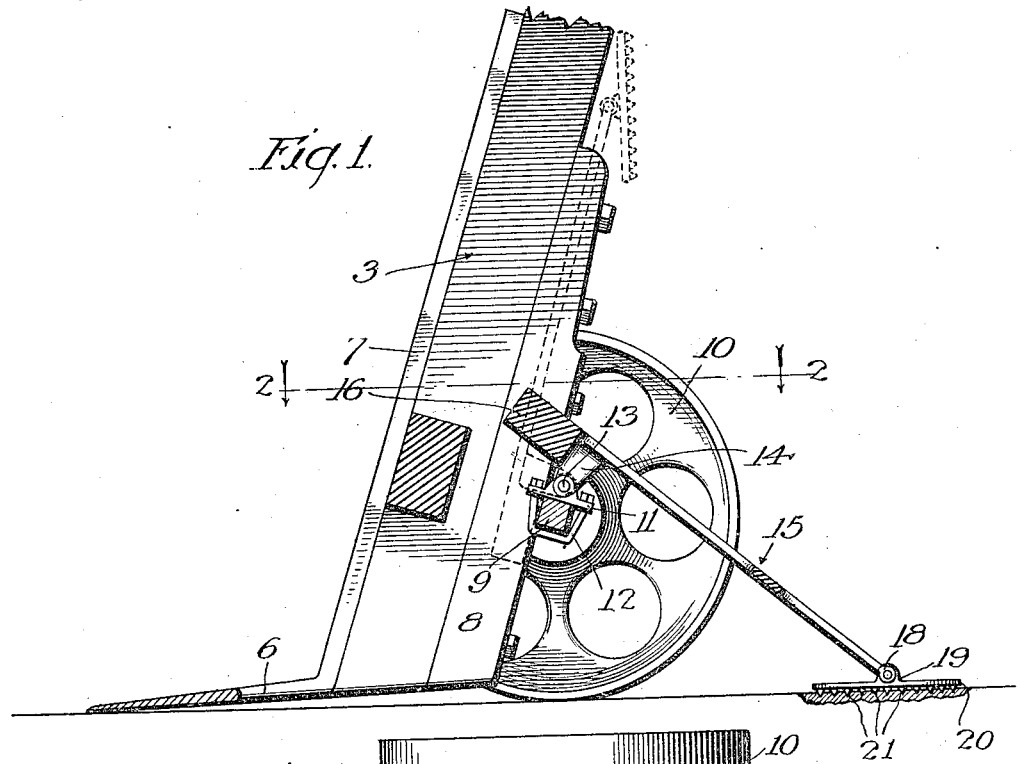
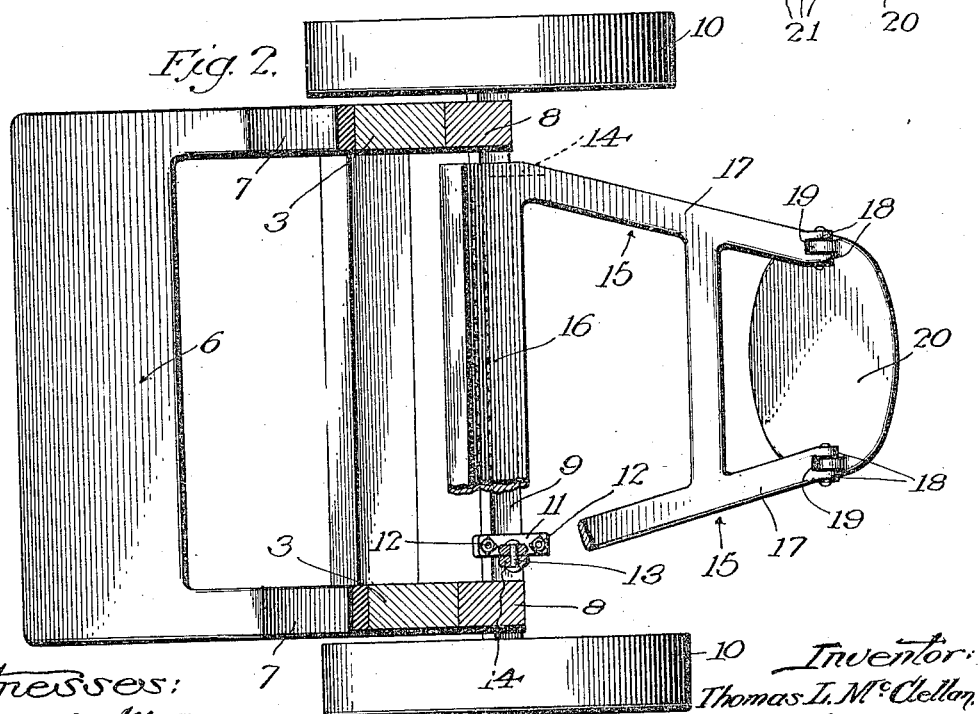
Witnesses:
Inventor:
Thomas L. McClellan
By James T. Bakelew
Attorney

UNITED STATES PATENT OFFICE.

THOMAS L. McCLELLAN, OF LOS ANGELES, CALIFORNIA.

TRUCK.

949,942.  Specification of Letters Patent.  Patented Feb. 22, 1910.

Application filed April 12, 1909. Serial No. 489,310.

*To all whom it may concern:*

Be it known that I, THOMAS L. MCCLELLAN, a citizen of the United States, residing at Los Angeles, in the county of Los Angeles and State of California, have invented new and useful Improvements in Trucks, of which the following is a specification.

The present invention relates to hand trucks of the class commonly known as warehouse trucks, being those having only two wheels. The difficulty frequently experienced with this class of truck in picking up a heavy article is well known. When the foot or platform of the truck has been placed under the article, the article still resting on the floor, and it is endeavored to tip the article and the truck back to a position where they may be moved, it is necessary to reach over the truck to obtain a hold on the article. In this position it is very difficult to apply sufficient force to the truck itself to prevent it from moving and it usually occurs that, when the weight of the article comes on the truck, the truck moves back from the article and thus prevents its being loaded thereon.

The present invention has for its object the provision of a simple device which will prevent the truck from moving during the operation of loading.

As an object of construction the device has been designed so that it is easily applied by the operator while in the position noted; in fact, the position of the device allows the operator larger freedom in reaching over the truck to grasp the loading article.

It is also an object of design to have the device out of the way when not in use, and to so proportion the different parts that it will automatically move to its normal out of the way position when the operator releases it.

In the accompanying drawings, Figure 1 is a sectional elevation of the lower portions of a truck equipped with my improved device. Fig. 2 is a sectional plan view of the same taken on line 2—2 of Fig. 1.

In the drawings 3 designates the lower portion of the frame of a truck having the general construction noted. Foot or platform 6 is attached to the lower end of the frame in the usual manner, straps 7 running up the sides of the frame for the purpose of strengthening the same and for protecting it from wear by the articles placed on the truck. The frame has a reinforcing member 8 on the back of each of its sides and across the backs of these reinforcing members extends shaft 9 on which wheels 10 are mounted. The central portion of the shaft is square, this shape affording better opportunity for the securing of the shaft to the frame and for the placement of my improved device thereon. The above is a general description of a truck to which the present device is adapted; but it is understood that the device may be modified in form and arrangement to be applied to any truck of the general character noted.

Mounted on shaft 9 are two pivot members 11, being held thereon by means of bolts 12, or other suitable means. A bolt or rivet 13 forms the pivot connecting the pivot member to a lug 14 on each side of brace frame 15, allowing the brace frame to turn thereon between the two positions shown and indicated in Fig. 1. This brace frame is of the general configuration shown in Fig. 2 and carries a weight bar 16 beyond its pivotal points on the side toward the frame of the truck. This weight is so proportioned and placed that, in the absence of any other restraining influence, it throws the frame to the position indicated in dotted lines where it is out of the way behind the truck frame. Side bars 17 of the brace frame converge at their ends and are provided with lugs 18 which receive between them ears 19 on foot plate 20. This foot plate is of the general formation illustrated and is provided with points 21 or equivalent corrugations on its under surface, although it is possible to make this foot plate in any other form and with any other equivalent means for engaging securely with the floor surface.

In using my improved device the truck is moved up to the box or other article and the platform placed thereunder. The operator then moves the brace frame from the position shown in dotted lines in Fig. 1 to the position shown in full lines, this being easily done with the foot. The foot of the operator is then placed firmly upon foot plate 20 and the truck is thus securely held from horizontal translation although it may be oscillated about its axis on shaft 9. With his foot upon the foot plate the operator then reaches over the truck and places the article thereon, releasing the foot plate when he has the article securely in position. The brace frame then immediately moves to its normal position where it is out of the way and the truck may then be handled in the usual manner.

Having described my invention, I claim:—

1. In combination with a truck, a brace frame pivotally mounted thereon, a foot plate pivotally mounted on the brace frame at one end and adapted to engage with the floor, and a counterbalance weight mounted on the brace frame at the other end thereof.

2. In combination with a truck, a brace frame pivotally mounted thereon, a counterbalance weight mounted on one end of the brace frame and adapted to normally retain the frame in an approximate vertical position, and a foot plate pivotally mounted on the other end of the frame and provided with a roughened surface adapted to grip the surface on which the truck stands.

3. In combination with a truck having a pair of supporting wheels and a shaft therefor, a brace frame pivotally mounted on the shaft, a counterbalance weight formed integrally with the brace frame on one end thereof and adapted to normally retain the brace frame in an approximate vertical position, and a foot plate pivotally mounted on the other end of the brace frame and having a roughened lower surface for engagement with the surface on which the truck stands.

In witness that I claim the foregoing I have hereunto subscribed my name this 6th day of April, 1909.

THOMAS L. McCLELLAN.

Witnesses:
JAMES T. BARKELEW,
EDWARD H. BARKELEW.